3,102,841
ANTIFUNGAL COMPOSITIONS CONTAINING 4-CYANO-PHENYL AND 5-CYANO-THIENYL-NITROETHYLENES

Alberto Vecchi and Gaetano Melone, both of Milan, Italy, assignors to Lepetit S.p.A., Milan, Italy, an Italian body corporate
No Drawing. Filed Oct. 5, 1961, Ser. No. 143,036
Claims priority, application Great Britain Apr. 29, 1957
15 Claims. (Cl. 167—30)

The present application is a continuation-in-part of our copending application Serial 727,772, filed April 11, 1958, now abandoned. It is concerned with antifungal compounds. More particularly, the invention is related with new antifungal compounds having the general formula:

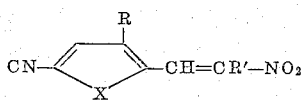

where X represents sulphur or vinylene, R represents hydrogen or a nitro group and R' represents hydrogen or bromine.

The compounds of the invention have been found exceptionally active in inhibiting the growth of pathogenic fungi. Against *Candida albicans* and *Trichophyton mentagrophytes*, for instance the compounds are active in concentrations ranging between 1 and 5 mcg./ml. and in some instances still lower.

For practical purposes, the compounds of the present invention are incorporated into pharmaceutical compositions destined for topical use. For instance, ointments can be prepared by incorporating the substances into the widely used ointment excipients, such as Vaseline, lanolin and mixtures thereof, with or without the addition of other additive to give the ointment some desirable properties, such as good flavor, quick absorbability, etc. Alternatively the preparation may be in the form of powder to be sprayed topically, by the addition of talc or starch or any other common ingredient useful to this purpose. Solutions for topical use are also prepared according to well known procedures, i.e. by dissolving the selected compound in a suitable solvent, such as ethanol, propylene glycol etc. and their mixtures. Although, as above stated, the new compounds are effective in concentrations as low as 1–5 mcg./ml. it is preferred to incorporate them in the preparations at fairly higher concentrations, in order to ensure a prompt relief from the fungal affection. Preparation containing 1 to 10% of the compounds are safely administered in view of the low toxicity of the new substances.

The appended examples 7 to 11 are only indicative of the compositions which may be prepared to obtain an effective and safe concentration of the compounds of the invention on the site to be healed.

The preparation of the compounds of the invention is carried out by starting from an aldehyde of the formula:

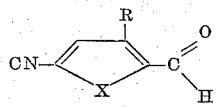

wherein X and R have the above significance. The starting compounds in which X is sulphur, i.e. 5-cyano-2-thiophenecarboxaldehydes are also novel compounds. The novel 5-cyano-2-thiophenecarboxaldehyde is prepared as indicated in Example 5.

The above aldehyde is mixed with an excess over an equivalent of nitromethane, then an alcoholic solution of potassium hydroxide is added taking care that the temperature of the mass reached 40° C. without exceeding this value. Acetic anhydride is then added, and the mixture is refluxed for 5–60 minutes. In some instances the product precipitates directly on cooling. In other cases no precipitation occurs, and the excess acetic anhydride must be destroyed by refluxing the mass with dilute hydrochloric acid; on cooling the product separates out.

The products obtained in this way correspond to the compounds of the above generic formula in which R' is hydrogen. To convert them into the halogenated compounds, the non-halogenated products are reacted with two equivalents of bromine, either in glacial acetic at ordinary pressure, or directly at ordinary or raised pressure, at temperatures ranging between 40 and 100° C. The reaction mixture is then diluted with glacial acetic acid, if this was not already present in the mixture, and half an equivalent of potassium carbonate is added. After refluxing for some minutes the brominated product precipitates on cooling and is collected in vacuo and dried. Yields are generally fairly good.

The following examples are illustrative of the invention.

EXAMPLE 1

*4-Cyano-β-Nitrostyrene*

To a well stirred and cooled mixture of 10 g. of 4-cyano-benzaldehyde and 5.0 g. of nitromethane, 1.9 ml. 25% of potassium hydroxide solution in methanol are added dropwise, taking care that the temperature reaches 40° C. without exceeding this value. Thirty-two millilitres of acetic anhydride are added and the mixture is refluxed for 30 minutes. After cooling, the precipitated product is collected by suction, washed with water and dried. Yield 9.2 g. (70%); M.P. 186–8° C.

EXAMPLE 2

*4-Cyano-β-Bromo-β-Nitrostyrene*

A mixture of 2 g. of 4-cyano-β-nitrostyrene and 1.85 g. of bromine is sealed in a glass tube and heated in a water-bath at 100° for 1.5 hours. After cooling and opening of the tube the thick brownish-red liquid is taken up in 10 ml. of glacial acetic acid whereby yellowish crystals separate. On heating a clear solution is obtained to which 0.8 g. of anhydrous potassium carbonate are added in portions. The mixture is then heated on a boiling water bath for 15 minutes, then cooled in ice, whereby a yellow precipitate forms, which is collected, washed with water and dried. Yield 2 g. (69%); M.P. 148–50° C.

EXAMPLE 3

*4-Cyano-2, -Dinitrostyrene*

To a well stirred and cooled mixture of 10 g. of 2-nitro-4-cyanobenzaldehyde and 5.65 g. of nitromethane, 13 ml. of potassium hydroxide solution in methanol are added dropwise, taking care that the temperature reaches, but does not exceed 40° C. Fifty millilitres of acetic anhydride are added and the mixture is refluxed for 5 minutes. After cooling, 50 ml. 5% of hydrochloric acid are added, and the mixture is heated on a boiling water bath until a clear solution forms. On cooling a precipitate forms, which is collected, washed with water and recrystallised from absolute ethanol. Yield 7 g. (55%); M.P. 133–5° C.

EXAMPLE 4

*4-Cyano-β-Bromo-2,β-Dinitrostyrene*

Three grams of 4-cyano-2,β-dinitrostyrene are heated for 1 hour at 100° C. in a sealed glass tube with 2.2 g. of bromine. The reaction mass is then dissolved in 30 ml. hot glacial acetic acid, then 1 g. anhydrous potassium carbonate is added. After heating to 100° C. for an additional 15 minutes the mixture is cooled, filtered from insoluble material and diluted with an equal volume water. The precipitate is dissolved by heating, then the solution is allowed to stand giving a flocky yellow precipitate, which is collected and recrystallized from 95% ethanol. Yield 2.2 g. (54%); M.P. 103–4° C.

EXAMPLE 5

1-(5-Cyano-2-Thienyl)-2-Nitroethylene

A mixture of 255 ml. of anhydrous pyridine, 26.2 g. of cuprous cyanide and 34.9 g. of 2-methyl-5-iodothiophene is refluxed in a round bottom flask on an oil bath with vigorous stirring for 8 hours. Pyridine is then removed by distillation in vacuo, and the residual dark mixture of oil and crystals is extracted with four 150 ml. portions of hot ethyl acetate. The combined organic extracts are washed with water and dried over anhydrous sodium sulphate. The solvent is removed in vacuo and the dark oily residue is distilled in a Claisen flask collecting the fraction distilling at 87–90° C. with 10 mm. light orange liquid, $n_D^{20}$ 1.5512. Yield 14 g. (73%).

Into a well stirred mixture of 14.0 g. of 2-methyl-5-cyano-thiophene, 175 ml. of acetic anhydride and 175 ml. of glacial acetic acid, previously cooled under 20° C., 25 ml. of conc. sulphuric acid are added dropwise taking care that the temperature does not exceed 25° C. The mixture is then cooled under 5° and 31.2 g. of chromium trioxide are added in small portions with stirring in 2 hours without exceeding 80° C. Stirring is continued for an additional 30 minutes between 10 and 12° C., then the mixture is poured into 400 ml. ice water. The precipitated crystals are collected by suction, washed with cold water and dried in vacuo at 40° C. Yield 15.3 g. (56%); M.P. 74–75° C.

The above product (15.3 g.) is suspended in a mixture of 60 ml. water, 60 ml. 95% of ethanol and 4.5 ml. conc. sulphuric acid and refluxed for 20 minutes; the solution is treated with charcoal and filtered hot. On cooling, long white needles separate, which are collected by suction, washed with water and dried in vacuo at 40° C. An additional crop is obtained on concentration of the mother liquors. Yield 8.45 g. (51.5% calculated on 2-methyl-5-cyano-thiophene); M.P. 96–97° C.

To a mixture of 20 g. of 5-cyano-2-thiophenecarboxaldehyde and 30 ml. nitromethane 4.8 ml. of 25% of potassium hydroxide solution in methanol are added, then the preparation is carried on as described in Example 1 refluxing for 10 minutes. Yield 16.4 g. (63%); M.P. 181–2° C.

EXAMPLE 6

1-(5-Cyano-2-Thienyl)-2-Bromo-2-Nitroethylene

A mixture of 8.2 g. of 1-(5-cyano-2-thienyl)-2-nitroethylene and 7.7 g. of bromine is heated for 20 minutes on a water bath. After cooling and addition of 45 ml. glacial acetic acid the preparation is carried on as described in Example 4, using 3.2 g. of anhydrous potassium carbonate. Yield 8.8 g. (75%); M.P. 151–3° C.

EXAMPLE 7

An ointment is prepared by incorporating 4-cyano-2,β-dinitrostyrene into usual ointment excipients in the following proportions:

| | G. |
|---|---|
| 4-cyano-2,β-dinitrostyrene | 0.1 |
| Vaseline oil | 10.0 |
| Lanolin | 10.0 |
| Vaseline q.s. to | 100.0 |

EXAMPLE 8

An ointment is prepared from the following ingredients:

| | G. |
|---|---|
| 4-cyano-β-bromo-2,β-dinitrostyrene | 0.1 |
| Olive oil | 25.0 |
| Yellow wax | 2.5 |
| Glycerine | 3.3 |
| Lanolin q.s. to | 100.0 |

EXAMPLE 9

A powder for topical use is prepared from:

| | G. |
|---|---|
| 4-cyano-β-nitrostyrene | 0.5 |
| Undecylenic acid | 1.0 |
| Na propionate | 15.0 |
| Salicylic acid | 1.0 |
| Boric acid | 5.0 |
| Talc q.s. to | 100.0 |

EXAMPLE 10

A solution for topical use is prepared from:

| | G. |
|---|---|
| 1-(5-cyano-2-thienyl)-2-nitroethylene | 1.0 |
| Ethanol 90 percent | 60.0 |
| Propylene glycol q.s. to | 100.0 |

EXAMPLE 11

An ointment is prepared from:

| | G. |
|---|---|
| 1-(5-cyano-2-thienyl)-2-bromo-2-nitroethylene | 1.0 |
| Ammonium tumenolate | 5.0 |
| Zinc oxide | 10.0 |
| Starch | 1.5 |
| Polyethylene glycol | 25.0 |
| Glycerine | 13.0 |
| Anhydrous lanolin | 23.0 |
| Distilled water q.s. to | 100.0 |

We claim:

1. The method of inhibiting the growth of pathogenic fungi, which comprises applying to them, in an effective concentration, a compound of the formula:

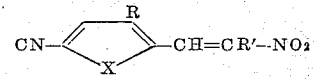

wherein X represents a member of the group consisting of sulphur and vinylene, R represents a member of the class consisting of hydrogen and a nitro group, and R' represents a member of the class consisting of hydrogen and bromine.

2. The method of inhibiting the growth of pathogenic fungi, which comprises administering an effective concentration of 4-cyano-β-nitrostyrene.

3. The method of inhibiting the growth of pathogenic fungi, which comprises administering an effective concentration of 4-cyano-β-bromo-β-nitrostyrene.

4. The method of inhibiting the growth of pathogenic fungi, which comprises administering an effective concentration of 4-cyano-2,β-dinitrostyrene.

5. The method of inhibiting the growth of pathogenic fungi, which comprises administering an effective concentration of 4-cyano-β-bromo-2,β-dinitrostyrene.

6. The method of inhibiting the growth of pathogenic fungi, which comprises administering an effective concentration of 1-(5-cyano-2-thienyl)-2-nitroethylene.

7. The method of inhibiting the growth of pathogenic fungi, which comprises administering an effective concentration of 1-(5-cyano-2-thienyl)-2-bromo-2-nitroethylene.

8. A composition for inhibiting the growth of pathogenic fungi which comprises as an active compound an effective concentration of a compound of the formula:

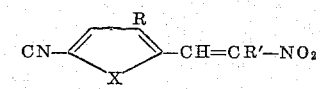

wherein X represents a member of the group consisting of sulphur and vinylene, R represents a member of the group consisting of hydrogen and a nitro group, and R' represents a member of the class consisting of hydrogen and bromine together with an acceptable pharmaceutical carrier.

9. A composition as defined in claim 8, wherein the concentration of the compound is about 0.1 to 1 percent.

10. A composition as defined in claim 8, wherein the compound is 4-cyano-β-nitrostyrene.

11. A composition as defined in claim 8, wherein the compound is 4-cyano-β-bromo-β-nitrostyrene.

12. A composition as defined in claim 8, wherein the compound is 4-cyano-2,β-dinitrostyrene.

13. A composition as defined in claim 8, wherein the compound is 4-cyano-β-bromo-2,β-dinitrostyrene.

14. A composition as defined in claim 8, wherein the compound is 1-(5-cyano-2-thienyl)-2-nitroethylene.

15. A composition as defined in claim 8, wherein the compound is 1-(5-cyano-2-thienyl)-2-bromo-2-nitroethylene.

References Cited in the file of this patent
UNITED STATES PATENTS 2,993,834    Melone et al. _____ July 25, 1961

OTHER REFERENCES

Timbal: Antibiotics and Chemotherapy, pages 93–98, vol. VIII, No. 2 (February 1958).